United States Patent [19]
Jego et al.

[11] Patent Number: 5,261,830
[45] Date of Patent: Nov. 16, 1993

[54] ELECTRICAL CONNECTION DEVICE OF CONDUCTIVE BARS OF ELECTRICAL CONDUITS

[75] Inventors: Gërard Jego, Brazey en Plaine; Jean-Yves Teinturier, Longvic; Jean-Pierre Thierry, Couternon, all of France

[73] Assignee: Telemecanique, Rueil Malmaison, France

[21] Appl. No.: 7,102

[22] Filed: Jan. 21, 1993

[30] Foreign Application Priority Data

Jan. 21, 1992 [FR] France .................. 92-00578

[51] Int. Cl.$^5$ .......................................... H01R 25/00
[52] U.S. Cl. ........................................ 439/210; 439/213
[58] Field of Search ................. 439/115, 116, 210, 213

[56] References Cited

U.S. PATENT DOCUMENTS

| | | |
|---|---|---|
| 3,339,009 | 8/1967 | Davis et al. |
| 3,376,377 | 4/1968 | Fehr |
| 3,408,454 | 10/1968 | Fouse .................. 439/213 X |
| 3,462,541 | 8/1969 | Davis et al. |
| 4,174,143 | 11/1979 | Hicks et al. .................. 439/213 |

*Primary Examiner*—Eugene F. Desmond
*Attorney, Agent, or Firm*—Oblon, Spivak, McClelland, Maier & Neustadt

[57] ABSTRACT

This invention relates to an electrical connection device comprising conductive bars of electrical conduits and further comprising, on the one hand, conductive splicing pads each joining ends of the conductive bars aligned end to end and, on the other hand, insulating splice elements that are inserted between the conductive bars so as to insulate them. The stack made of the inserted insulating elements and of the splicing pads on the conductive bar ends is tightened by a common bolt-type tightening element that goes through them. Further, at least one of the splicing pads comprises at least one separable part so that this separable splicing pad part can be removed and replaced with a branch output device.

17 Claims, 5 Drawing Sheets

Coupe III-III

Coupe I-I

Coupe II-II

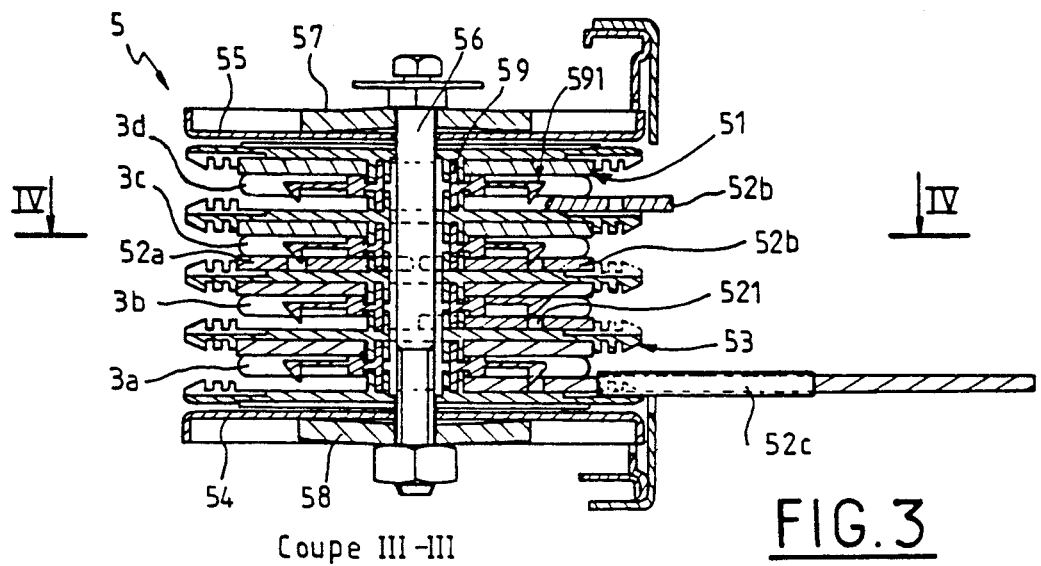
Coupe III-III    FIG.3
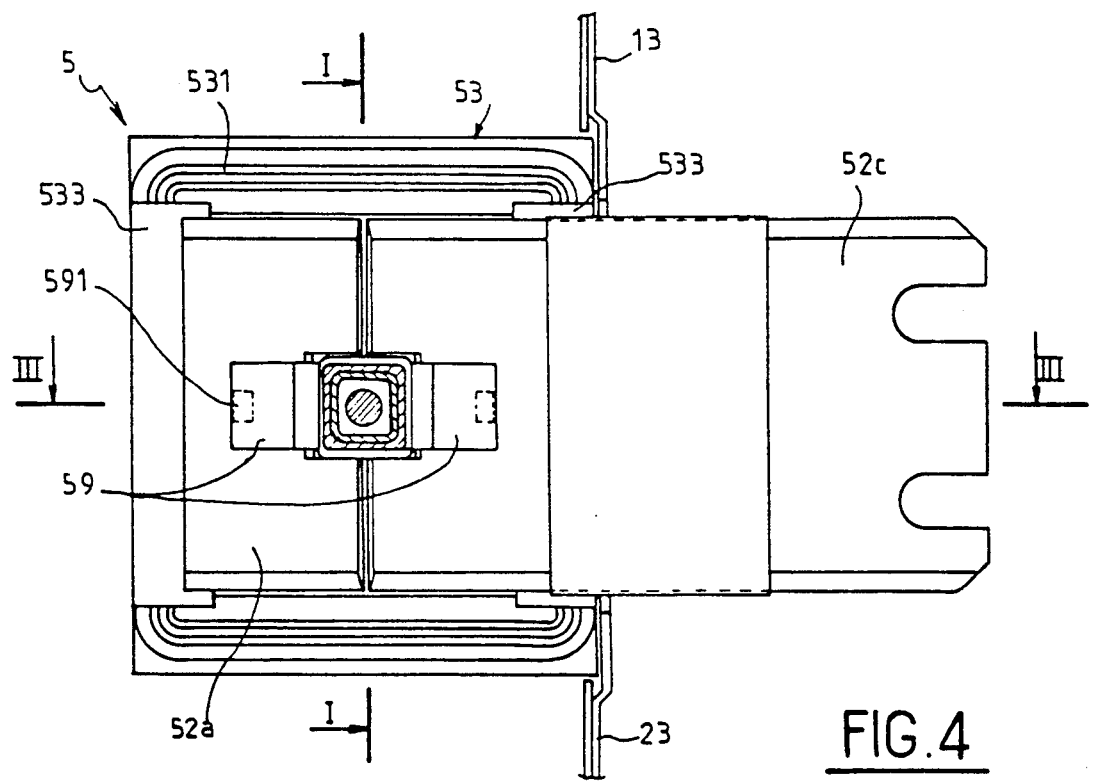
FIG.4

Coupe III-III 5,261,830

ELECTRICAL CONNECTION DEVICE OF CONDUCTIVE BARS OF ELECTRICAL CONDUITS

BACKGROUND OF THE INVENTION

1. Field of the Invention

This invention is directed to an electrical connection device which comprises conductive bars of electrical conduits comprising, on the one hand, conductive splicing pads each electrically connecting the ends of two conductive bars aligned end to end and, on the other hand, insulating splice elements that are inserted between the bars so as to insulate them. A stack made of the inserted insulating elements and of the splicing pads on the bar ends is tightened by a common bolt-type tightening element that goes through them.

2. Discussion of the Background

Electrical distribution systems are known that are formed by elements of conduits containing sections of rigid conductive bars that are held in an insulating way in these conduits and that are approximately the same length as the conduits.

The conductive bars of two adjacent sections are joined by means of a connection block including conductive splicing pads associated with insulating elements or insulating barriers assuring the insulation between phases. The tightening of the stack of the conductive pads and of the insulating elements on the ends of the bars is assured by a bolt going through the stack. The width of the pads and of the insulating elements is adapted to the number of conductive bars per phase. Depending on the case, it is possible to provide one bar per phase or two bars per phase or three bars per phase. U.S. Pat. No. 4,705,334 describes a connection block of the above type.

To be able to install a branch output device at the junction of two sections, it is necessary to remove the connection block completely and mount a new connection block provided with current branches. Known connection blocks do not therefore make it possible to easily install branch output devices.

SUMMARY OF THE INVENTION

Accordingly, one object of the present invention is to provide a connection block of conductive bars making it possible to easily install current branch output devices, i.e., without having to remove the installed connection block completely. According to the present invention, the mounting of a branch output device is performed easily, after loosening of the bolt, removal of a pad part, positioning of a branch output device and retightening of the bolt. The device of the present invention is particularly suited to a distribution system having one, two, three (or even more) conductive bars per phase.

The connection device according to the present invention is constructed so that at least one splicing pad comprises at least one separable part so that this separable pad part can be removed and replaced with a branch output device.

According to one feature of the present invention, the device of the present invention comprises hooking means to join the separable pad part or the branch output device to the rest of the device.

According to a further feature of the present invention, the hooking means are mounted on spacers mounted between insulating elements so as to be immobilized in relation to the insulating elements.

According to another feature of the present invention, each removable pad may comprise two laterally removable parts.

According to another feature of the present invention, each removable pad may comprise a nonremovable central part located between the two removable lateral parts so as to receive more than one bar per phase.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 3 is a cross section, taken along III—III of FIG. 1, which shows the device equipped with a branch output device connected thereto and with means for hooking the conductive splicing pads;

FIG. 4 is a section along IV—IV of FIG. 3;

DESCRIPTION OF THE PREFERRED EMBODIMENTS

Figure 1:
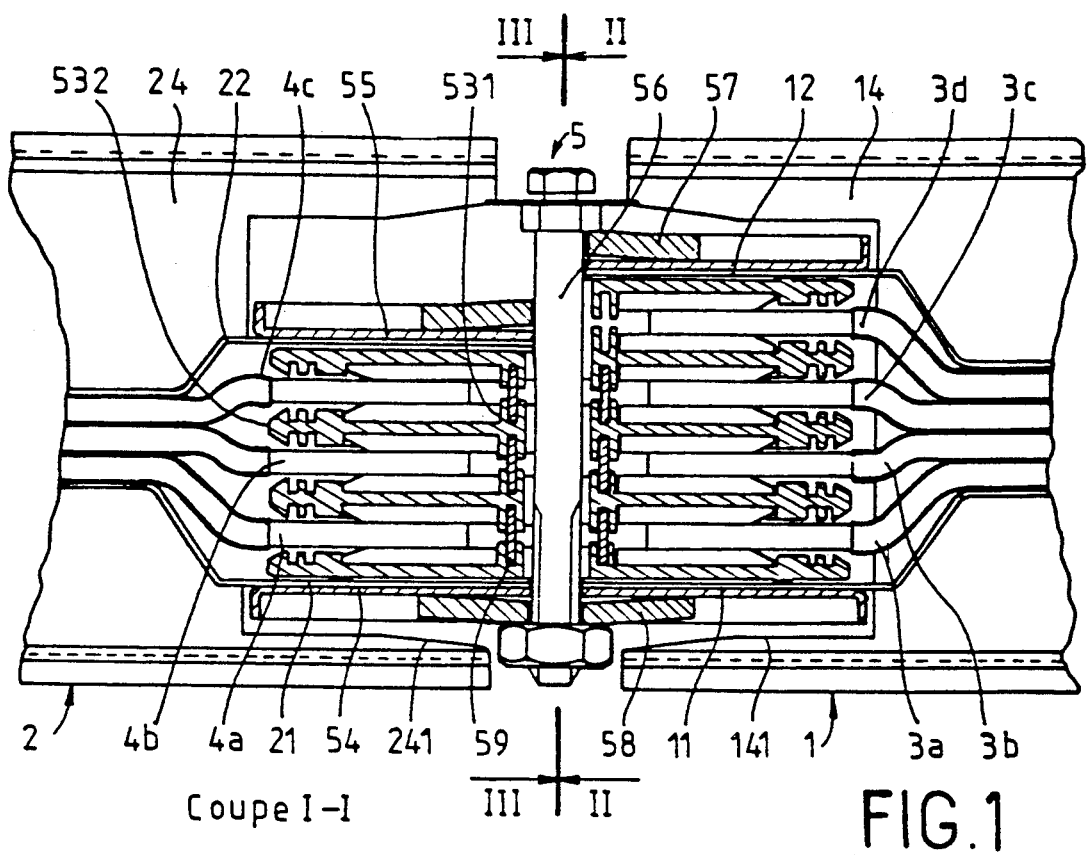
FIG. 1 is a longitudinal section of the connection device according to the invention as well as of the conduits and the rigid conductors that it joins.
Figure 2:
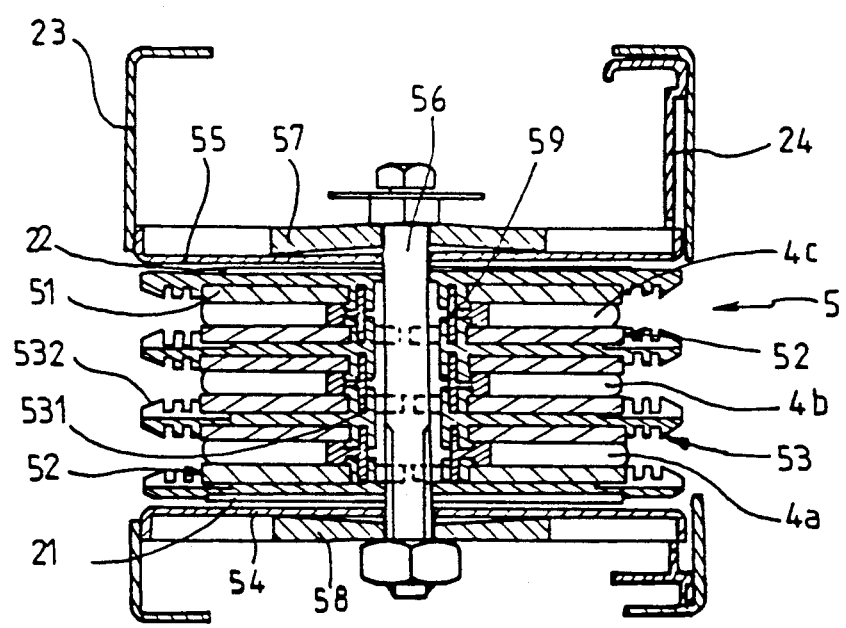
FIG. 2 is a cross section, taken along II—II of the device of FIG. 1, shown without a branch output device connected thereto.

Referring now to the drawings wherein like reference numerals designate identical or corresponding parts throughout the several views, and more particularly to FIGS. 1-10 thereof, the connection block according to the invention is marked 5 as a whole. The connection block 5 is mounted between two distribution sections 1 and 2 containing conductors marked 3a, 3b, 3c, 3d and 4a, 4b, 4c, respectively. These conductors include bars or strips whose sections are approximately rectangular or the like (H-shaped, etc.).

These conductive bars are insulated and are arranged in a stack, except for their ends where a physical separation is performed making it possible for the physical connection of the bars to one another.

By way of indication, FIG. 1 shows on the right side a stack made of three phases $3a$, $3b$, $3c$ and a neutral element $3d$ and on the left side a stack made of three phases $4a$, $4b$, $4c$.

Conductive bars 3 and 4 are enveloped by a ground conductor which comprises a lower strip, 11 and 21 respectively, and an upper strip, 12 and 22 respectively.

On the length where the phase bars 3a, 3b, 3c, 4a, 4b, 4c are placed side by side, the ground strips (lower and upper) are brought together. On the ends, the ground strips (lower and upper) separate and end by connection surfaces.

The conductive bars 3 and 4 are held by lateral rails 13 and 14.

Lower ground strip 11 (or 21), upper ground strip 12 (or 22) and the two lateral rails 13 and 14 (or 23 and 24) serve as housing for the conductive bars 3 and 4.

Each lateral rail 13 or 14 of support 1 exhibits at its ends cuttings such as 141 which make it possible for the branching of branch output devices as will be described below. Also, lateral rails 23 and 24 of the adjacent support 2 exhibit, at their ends, cuttings such as 241 that cooperate with cuttings 141 already mentioned.

Connection block 5 is used to connect two aligned sections such as aligned sections 1 and 2 of FIG. 1, with one or two transverse branches or further a section such as 1 with one transverse branch.

This connection block 5 comprises a lower cover 54 and are upper cover 55. An assembly bolt 56 goes through the two covers. Belleville spring washers 57 and 58 cooperate with assembly bolt 56 to assure the tightening at a determined torque.

The electrical connection is assured by plate-shaped electrical splicing pads 51 and 52 which each connect the ends of two conductive bars 3a and 4a, etc., aligned end to end. Electrical splicing pads 51 and 52 are made of electrically conductive material. Splicing pads 51 are located above the conductive bars 3a and 4a, etc., and are in contact with them, while splicing pads 52 are located below the conductive bars 3a and 4a, etc., and are in contact with them.

The splicing pads 51, 52 and the conductive bars 3a and 4a, etc., are separated and insulated by plate-shaped insert elements 53 which are made of electrically insulating material. Each of these insulating elements 53 is inserted between the bars of two different phases or between one phase and the neutral element so as to insulate them. The upper insulating element 53 carries, on the lower side, a splicing pad 51 and is in contact, on the upper side, with ground 12, 22. The lower insulating element 53 carries, on the upper side, a splicing pad 52 and is in contact, on the lower side, with ground 11, 21. Each of the other insulating elements 53 carries, on the upper side, splicing pad 52 and, on the lower side, splicing pad 51. The tightening of the stack made of insert insulating elements 53 of splicing pads 51 and 52 and of the conductive bars 3a and 4a, etc., is performed by bolt 56 which goes through the unit.

One of the two splicing pads surrounding a conductive bar is a removable splicing pad, while the other splicing pad is nonremovable. Preferably, the nonremovable splicing pad, marked 51, is located above the conductive bar, while the removable splicing pad, marked 52, is located below the conductive bar so as to be carried by an insulating element 53.

Each of the removable splicing pads 52 comprises at least one separable part 52b so that this removable pad part 52b can be removed and replaced with a branch output device 52c.

In the embodiments of FIGS. 1 to 8, each of the lower splicing pads 52 includes two parts 52a and 52b. Each of the two parts 52a or 52b can be removed to be replaced with a branch output device such as 52c. Each splicing pad 52 as a whole covers a square general surface, each of the constituent parts 52a, 52b covering approximately one half of this surface.

Figure 9:
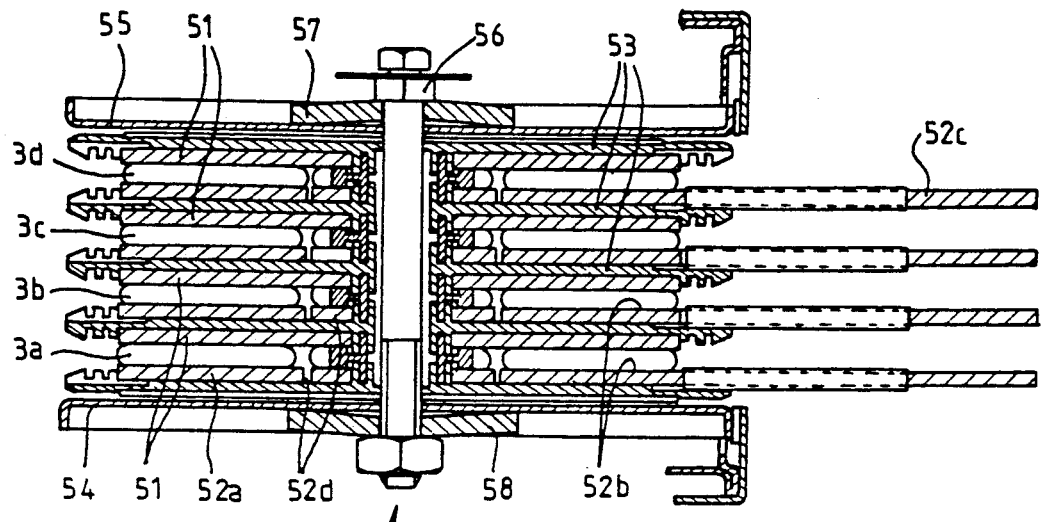
FIG. 9 is a cross section, along III—III of FIG. 1, showing an embodiment corresponding to two (or three) conductive bars per phase.

In the embodiment of FIG. 9, lower splicing pad 52 includes three parts, the central part being marked 52d, the two lateral parts being marked 52a and 52b. The embodiment of FIG. 9 is suited to a distribution system comprising 2 conductive bars per phase or to a distribution system comprising 3 conductive bars per phase.

Each insulating insert element 53 exhibits, on at least one face, a square-shaped central annular edge 531 bordering the central bore and being used for the immobilization in rotation and for the holding of a spacer 59. Furthermore, on at least one face, insulating insert element 53 exhibits an edge 532 bordering its outside periphery and which is used for the holding of splicing pad 51 or 52. Each upper or lower insulating insert element 53 exhibits edges 531 and 532 on a single face. Each insulating insert element 53 located between these two end elements exhibits edges 531 and 532 on its two opposite faces. Each splicing pad 51 or 52 exhibits a central bore or a central cutting so that it fits around central edge 531 of the adjacent insulating insert element 53.

Each insulating insert element 53 exhibits, on the side of the removable pad, and on the lateral sides (in relation to the bars), cuttings 533 made in peripheral edge 531. These cuttings 533 make it possible for the removal of the separable pads and the mounting of the output branch devices.

Insulating insert elements 53 are separated two by two by spacers 59 carrying locking means 591 of the separable splicing pads or of the output surfaces. Each spacer 59 is engaged in the grooves of central edges 531 of two adjacent insulating insert elements 53. These grooves and the corresponding studs of the spacers have square shapes assuring immobilization in rotation.

The device comprises connecting means to hold pad parts 52a, 52b, 52c on insulating insert elements 53 on which they rest, these connecting means making removal possible.

In the embodiment of FIGS. 3 and 4, spacers 59 carry hook-shaped elements 591 that can be fitted into slots or hooking holes 521 made in splicing pads 52a or 52b or in branch output devices 52c so as to make them solid with adjacent insulating elements 53. FIG. 3 exhibits a splicing pad 52b being changed, at the upper level; a branch output device 52c, at the lower level; and splicing pads 52a snapped in and being removed, at the intermediate levels.

Figure 5:
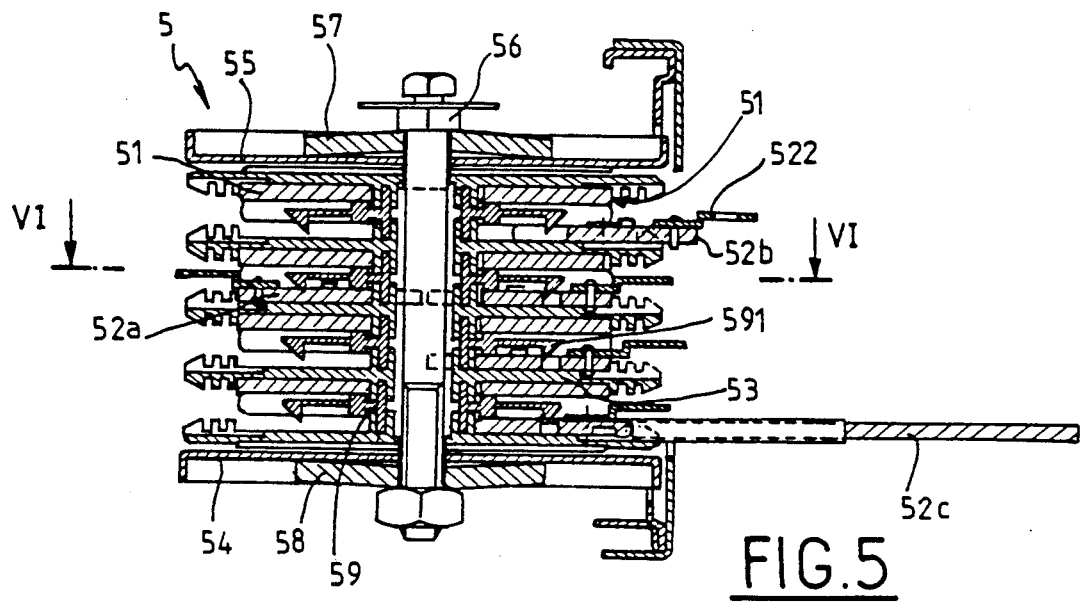
FIG. 5 is a cross section, along III—III of FIG. 1, which shows the device equipped with a branch output device connected thereto and with a first variant of the means for hooking the conductive splicing pads.
Figure 6:
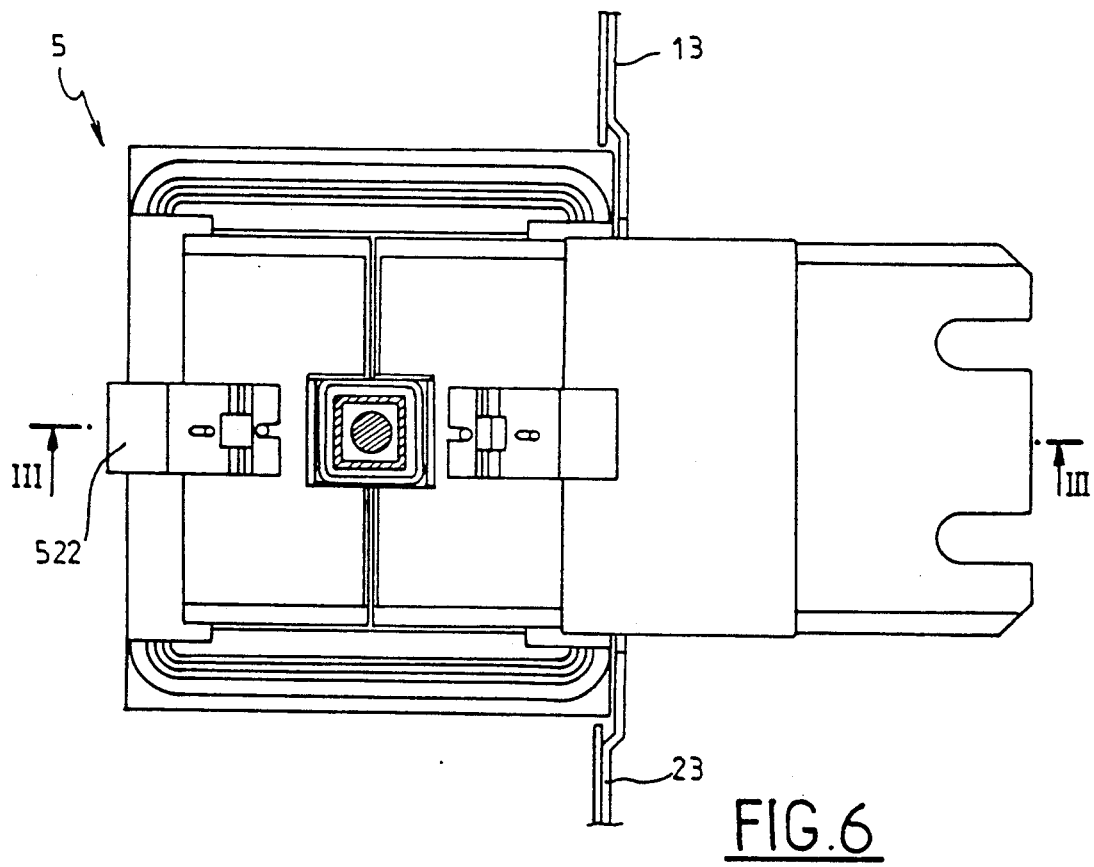
FIG. 6 is a section along VI—VI of FIG. 5.

In the embodiment of FIGS. 5 and 6, splicing pads 52 carry unlocking tools 522 that are used, by a translation movement, to unlock hooks 591 of the pads.

Figure 7:
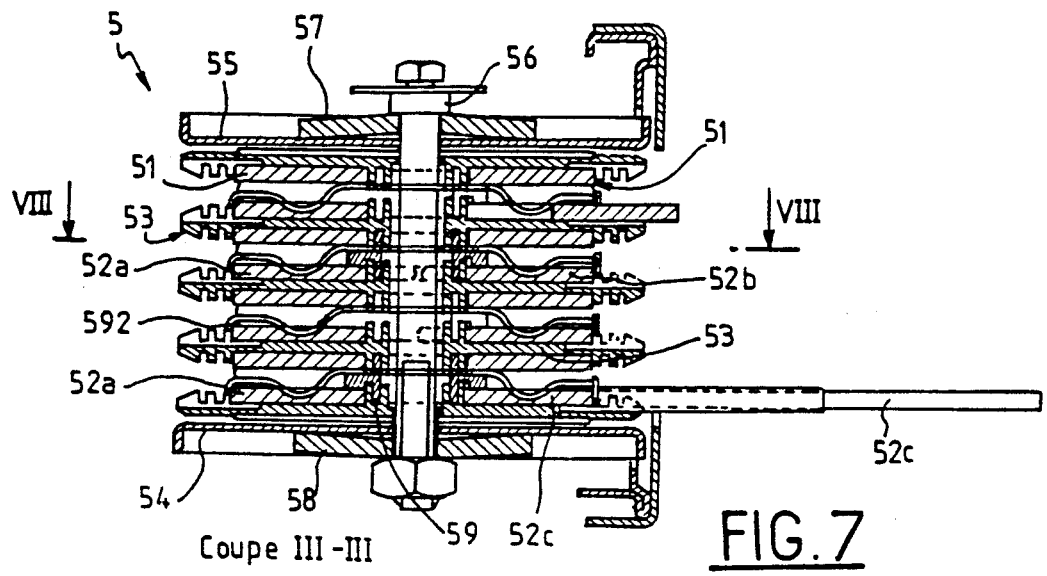
FIG. 7 is a cross section, along III—III of FIG. 1, which shows the device equipped with a branch output device connected thereto and with a third variant of the means for hooking the conductive pads.
Figure 8:
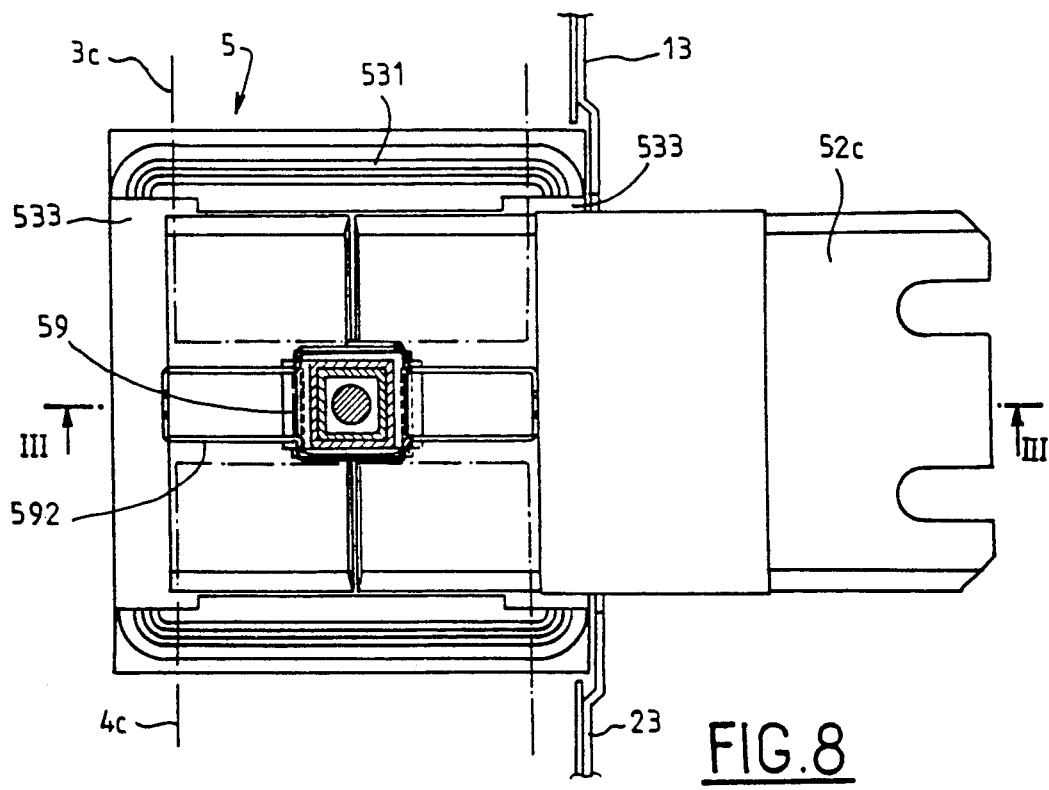
FIG. 8 is a section along VIII—VIII of FIG. 7.

In the embodiment of FIGS. 7 and 8, spacers 59 carry hooks 592 each consisting of a folded wire.

The embodiment of FIG. 9 is suited to a distribution system having two or three bars per phase. Splicing pad 52 comprises a stationary central part 52d that is nonremovable and removable lateral parts 52a and 52b. Each part 52d, 52a, 52b is in contact with a conductive bar.

Figure 10:
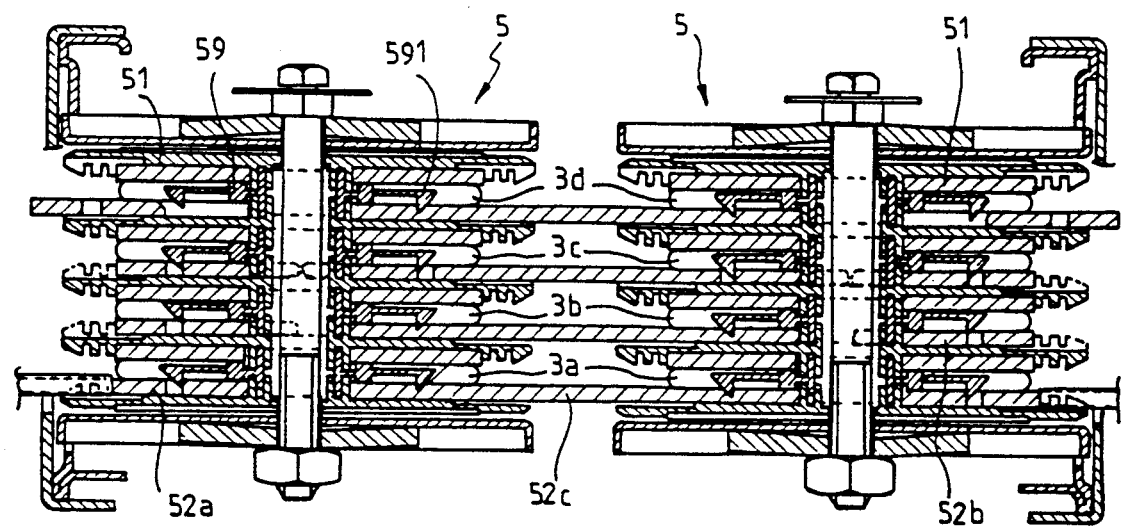
FIG. 10 is a cross section of two connection devices connected together.

The embodiment of FIG. 10 shows two adjacent connection devices 5. Removable pad parts 52c connect the two devices. Another removable pad part 52a or 52b completes pad part 52c.

Obviously, numerous modifications and variations of the present invention are possible in light of the above teachings. It is therefore to be understood that within the scope of the appended claims, the invention may be

What is claimed as new and desired to be secured by letters patent of the United States is:

1. An electrical connection device comprising: conductive bars (4a, 4b, 4c and 3a, 3b, 3c, 3d) of electrical conduits comprising, on the one hand, conductive splicing pads (51, 52) each joining ends of the bars (4a, 3a, ...) aligned end to end and, on the other hand, insulating splice elements (53) that are inserted between the bars so as to insulate them, the tightening of the stack made of said insert insulating elements and of said pads on the bar ends being performed by a common bolt-type tightening element (56) that goes through them, wherein at least one of the pads (52) comprises at least one separable part (52b) so that this pad part (52b) can be removed and replaced with a branch output surface (52c).

2. The device according to claim 1, further comprising hooking means to join the separable pad part (52b) or the branch output surface (52c) to the rest of the device.

3. The device according to claim 2, wherein the hooking means consist of hooks (591, 592).

4. The device according to either of claims 2 or 3, wherein the hooking means are mounted on spacers (59) mounted between the insulating elements (53) so as to be immobilized in relation to said insulating elements.

5. The device according to any one of claims 1-3, wherein each removable pad (52) comprises two laterally removable parts (52a and 52b).

6. The device according to claim 5, wherein each removable pad (52) comprises a nonremovable central part (52d) located between the removable lateral parts (52a, 52b) so as to receive more than one bar per phase.

7. The device according to any one of claims 1-3, wherein each insulating element (53) exhibits, on the side of a removable pad (52), a peripheral edge (532) associated with cuttings (533) for removal and remounting.

8. An electrical connection device comprising:
a conductive bar;
a first conductive splicing pad formed on a top of the conductive bar;
a second conductive splicing pad formed on a bottom of the conductive bar;
a first insulating splice element formed on a top of the first conductive splicing pad;
a second insulating splice element formed on a bottom of the second conductive splicing pad, wherein the conductive bar, the first and second conductive splicing pads and the first and second insulating splice elements form a stacked structure;
a bolt-tightening element which passes through the stacked structure for tightening the stacked structure; and
at least one of the first or second conductive splicing pads comprising a first separable part which can be removed and replaced with a first branch output device.

9. The electrical connection device according to claim 8, further comprising a connecting means for connecting the first separable part or the first branch output device to the electrical connection device.

10. The electrical connection device according to claim 9, wherein the connecting means comprises a hook-shaped element.

11. The electrical connection device according to claim 10, wherein the hook-shaped element is mounted on spacers, the spacers being mounted between the first and second insulating splice elements so as to be immobilized in relation to said first and second insulating splice elements.

12. The electrical connection device according to claim 8, wherein the at least one of the first or second conductive splicing pads comprising the first separable part further comprises a second separable part which can be removed and replaced with a second branch output device.

13. An electrical connection device comprising:
a plurality of conductive elements, each conductive element comprising:
a conductive bar;
a first conductive splicing pad formed on a top of the conductive bar;
a second conductive splicing pad formed on a bottom of the conductive bar;
a plurality of insulating splice elements formed between every two adjacent conductive elements so as to insulate every two adjacent conductive elements, wherein the plurality of conductive elements and the plurality of insulating splice elements form a stacked structure;
a bolt-tightening element which passes through the stacked structure for tightening the stacked structure;
at least one of the first or second conductive splicing pads of at least one of the plurality of conductive elements comprising a first separable part which can be removed and replaced with a first branch output device.

14. The electrical connection device according to claim 13, further comprising a connecting means for connecting the first separable part or the first branch output device to the electrical connection device.

15. The electrical connection device according to claim 14, wherein the connecting means comprises a hook-shaped element.

16. The electrical connection device according to claim 15, wherein the hook-shaped element is mounted on spacers, the spacers being mounted between two adjacent insulating splice elements so as to be immobilized in relation to said two adjacent insulating splice elements.

17. The electrical connection device according to claim 13, wherein the at least one of the first or second conductive splicing pads of the at least on conductive element comprising the first separable part further comprises a second separable part which can be removed and replaced with a second branch output device.

* * * * *